United States Patent
Zhong

(10) Patent No.: US 11,536,995 B2
(45) Date of Patent: Dec. 27, 2022

(54) DISPLAY PANEL AND DISPLAY DEVICE

(71) Applicant: WUHAN CHINA STAR OPTOELECTRONICS TECHNOLOGY CO., LTD., Hubei (CN)

(72) Inventor: Li Zhong, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/981,761

(22) PCT Filed: Jul. 27, 2020

(86) PCT No.: PCT/CN2020/104795
§ 371 (c)(1),
(2) Date: Sep. 17, 2020

(87) PCT Pub. No.: WO2021/258489
PCT Pub. Date: Dec. 30, 2021

(65) Prior Publication Data
US 2021/0397054 A1    Dec. 23, 2021

(30) Foreign Application Priority Data
Jun. 23, 2020   (CN) .......................... 202010578189.8

(51) Int. Cl.
*G02F 1/1333* (2006.01)
*G02F 1/1362* (2006.01)
*G02F 1/13357* (2006.01)

(52) U.S. Cl.
CPC ...... *G02F 1/1333* (2013.01); *G02F 1/133603* (2013.01); *G02F 1/136222* (2021.01); *G02F 1/136286* (2013.01)

(58) Field of Classification Search
None
See application file for complete search history.

(56) References Cited

U.S. PATENT DOCUMENTS

2009/0141004 A1* 6/2009 Yamazaki ............. H01L 33/005
345/175
2011/0012115 A1* 1/2011 Jeon .................... G02F 1/13338
438/149
(Continued)

FOREIGN PATENT DOCUMENTS

CN    110275340 A  *  9/2019
CN    110275340 A      9/2019
(Continued)

OTHER PUBLICATIONS

English translation of CN-110275340-A, Title: For shielding the liquid crystal display of lower identification scheme, Author: Zha Guowei; Date of publication: Sep. 24, 2019 (Year: 2019).*

*Primary Examiner* — Shan Liu
(74) *Attorney, Agent, or Firm* — Mark M. Friedman

(57) ABSTRACT

A display panel and a display device are provided. The display panel includes a first pixel area and a second pixel area adjacent to the first pixel area. The display panel includes an array substrate, a color film substrate arranged oppositely to the array substrate, a liquid crystal layer between the array substrate and the color film substrate, and a backlight module positioned at a side of the color film substrate, which is back on to the array substrate. The display panel comprises a plurality of micro light emitting diode (micro LED) lighting units. A transparent area is placed among the micro LED lighting units, and the color film substrate includes a color filter in the second pixel area.

5 Claims, 4 Drawing Sheets

(56) References Cited

U.S. PATENT DOCUMENTS

| | | | | |
|---|---|---|---|---|
| 2018/0188606 A1* | 7/2018 | Lee | ................... | G02F 1/133609 |
| 2018/0357460 A1* | 12/2018 | Smith | ................. | H01L 27/3227 |
| 2019/0348440 A1* | 11/2019 | Yu | ..................... | G02F 1/133603 |
| 2019/0373166 A1 | 12/2019 | Jia | | |
| 2020/0244787 A1* | 7/2020 | Gu | ..................... | H04M 1/0264 |

FOREIGN PATENT DOCUMENTS

| | | | | | |
|---|---|---|---|---|---|
| CN | 110632789 A | | 12/2019 | | |
| CN | 110794604 A | * | 2/2020 | ......... | G02F 1/13306 |
| CN | 110794604 A | | 2/2020 | | |
| WO | WO-2021103390 A1 | * | 6/2021 | ......... | G02F 1/13306 |

* cited by examiner

DISPLAY PANEL AND DISPLAY DEVICE

FIELD OF THE INVENTION

The present invention relates to a display technique, and more particularly, to a display panel and a display device.

BACKGROUND

Under-screen sensing technique becomes a development key point in a medium/small-size display device due to the demands for full-screen and integrated display device. Because the LCD panel is a passive lighting device illuminated by the backlight module, the optical sensor and the optical display cannot be spatially overlapped. Therefore, it becomes more difficult for LCD panel to become a full-screen device.

In contrast to LCD panel, OLED panel is an active lighting device illuminated by each OLED pixel. OLED panel has advantages such as high contrast, thin, flexible and bendable. In addition, because the OLED panel does not need a backlight module, it can be well integrated with the conventional optical sensor. Thus, the integrated optical sensing technique has become a unique advantage of the OLED panel and allows the OLED panel to be switched between the display mode and the imaging mode. Furthermore, LCD panel has a carved out area but the carved out area cannot be used to display images but OLED panel does not have this issue.

Although the LCD panel has a low-cost advantage, this advantage becomes unimportant because of the increasing demands of the full-screen. Therefore, it is important to improve the conventional LCD panel to meet the full-screen demands.

SUMMARY

Technical Problem

One objective of an embodiment of the present invention is to provide a display panel and a display device to solve the above-mentioned issue where a conventional LCD panel cannot spatially overlap the optical sensor and the display in order to further meet the full-screen demand.

Technical Solution

According to an embodiment of the present invention, a display panel is disclosed. The display panel comprises a first pixel area and a second pixel area adjacent to the first pixel area. The display panel comprises an array substrate, a color film substrate arranged oppositely to the array substrate, a liquid crystal layer between the array substrate and the color film substrate, and a backlight module positioned at a side of the color film substrate, which is back on to the array substrate. The display panel comprises a plurality of micro light emitting diode (micro LED) lighting unit, a transparent area is placed among the micro LED lighting unit, and the color film substrate comprises a color filter in the second pixel area.

In the display panel, the micro LED lighting unit comprises a electrode surface and a substrate surface opposite to the electrode surface, the electrode surface has a first electrode, the micro LED lighting unit is placed to have the electrode surface face the backlight module, and a lighting direction of the micro LED lighting unit is from the electrode surface to the substrate surface.

In the display panel, the color film substrate comprises: a first substrate. The micro LED lighting unit is positioned correspondingly to the first pixel area on the first substrate. The color filter is positioned correspondingly to the second pixel area on the first substrate. A second electrode corresponding to the first electrode is placed in the first pixel area of the first substrate.

In the display panel, the micro LED lighting unit and the color filter are located on a side of the first substrate, which is back on to the backlight module, and the first electrode of the micro LED lighting unit is electrically connected to the second electrode.

In the display panel, the micro LED lighting unit is placed on a side of the first substrate, which is close to the backlight module, the color filter is placed on a side of the first substrate, which is back on to the backlight module, and the micro LED lighting unit is electrically connected to the second electrode through the first electrode.

In the display panel, the first electrode extends from the electrode surface to a position corresponding to the second electrode along a side surface of the micro LED lighting unit.

In the display panel, the color film substrate further comprises a first driving circuit, the first driving circuit is corresponding to the first pixel area and placed on a side surface of the first substrate, which is facing the micro LED lighting unit, the micro LED lighting unit is electrically connected to the first driving circuit.

In the display panel, the first driving circuit comprises scan lines extending horizontally and data lines extending vertically, two adjacent scan lines and two adjacent scan lines define a sub-pixel area, and an orthogonal projection of the Micro Led lighting unit on the first substrate is smaller than an area of the sub-pixel area.

In the display panel, the orthogonal projection of the micro LED lighting unit on the first substrate occupies 10%-50% of an area of the sub-pixel area, and the micro LED lighting unit comprises a red lighting unit, a green lighting unit and a blue lighting unit.

In the display panel, the array substrate comprises a second substrate. The micro LED lighting unit, corresponding to the first pixel area and placed on a side of the second substrate, which is close to the color film substrate. A second electrode corresponding to the first electrode is placed on a position the second substrate, which corresponds to the first pixel area; and the first electrode is electrically connected to the second electrode.

In the display panel, the first electrode extends from an electrode surface of the micro LED lighting unit to a position of the second substrate, which is corresponding to the second electrode, along a side surface of the micro LED lighting unit.

In the display panel, the array substrate further comprises a second driving circuit, corresponding to the second pixel area and placed on the second substrate.

According to another embodiment of the present invention, a display device is disclosed. The display device includes a display panel. The display panel includes a first pixel area and a second pixel area adjacent to the first pixel area. The display panel comprises an array substrate, a color film substrate arranged oppositely to the array substrate, a liquid crystal layer between the array substrate and the color film substrate, and a backlight module positioned at a side of the color film substrate, which is back on to the array substrate. The display panel comprises a plurality of micro light emitting diode (micro LED) lighting units, a transparent area is placed among the micro LED lighting units, and the color film substrate comprises a color filter in the second pixel area.

In the display device, the micro LED lighting unit comprises a electrode surface and a substrate surface opposite to the electrode surface, the electrode surface has a first electrode, the micro LED lighting unit is placed to have the electrode surface face the backlight module, and a lighting direction of the micro LED lighting unit is from the electrode surface to the substrate surface.

In the display device, the color film substrate comprises: a first substrate. The micro LED lighting unit is positioned correspondingly to the first pixel area on the first substrate. The color filter is positioned correspondingly to the second pixel area on the first substrate. A second electrode corresponding to the first electrode is placed in the first pixel area of the first substrate.

In the display device, the micro LED lighting unit and the color filter are located on a side of the first substrate, which is back on to the backlight module, and the first electrode of the micro LED lighting unit is electrically connected to the second electrode.

In the display device, the micro LED lighting unit is placed on a side of the first substrate, which is close to the backlight module, the color filter is placed on a side of the first substrate, which is back on to the backlight module, and the micro LED lighting unit is electrically connected to the second electrode through the first electrode.

In the display device, the first electrode extends from the electrode surface to a position corresponding to the second electrode along a side surface of the micro LED lighting unit.

In the display device, the color film substrate further comprises a first driving circuit, the first driving circuit is corresponding to the first pixel area and placed on a side surface of the first substrate, which is facing the micro LED lighting unit, the micro LED lighting unit is electrically connected to the first driving circuit.

In the display device, the first driving circuit comprises scan lines extending horizontally and data lines extending vertically, two adjacent scan lines and two adjacent scan lines define a sub-pixel area, and an orthogonal projection of the Micro Led lighting unit on the first substrate is smaller than an area of the sub-pixel area.

In the display device, the orthogonal projection of the micro LED lighting unit on the first substrate occupies 10%-50% of an area of the sub-pixel area, and the micro LED lighting unit comprises a red lighting unit, a green lighting unit and a blue lighting unit.

In the display device, the array substrate comprises a second substrate. The micro LED lighting unit, corresponding to the first pixel area and placed on a side of the second substrate, which is close to the color film substrate. A second electrode corresponding to the first electrode is placed on a position the second substrate, which corresponds to the first pixel area; and the first electrode is electrically connected to the second electrode.

In the display panel, the first electrode extends from an electrode surface of the micro LED lighting unit to a position of the second substrate, which is corresponding to the second electrode, along a side surface of the micro LED lighting unit.

Advantageous Effects

The display panel and the display device according to an embodiment of the present invention could combine the micro LED display technique with the LCD display technique. In this way, the LCD full-screen panel could be realized. In addition, because the micro LED lighting unit is small, this could raise the aperture rate of the panel and realize the in-screen sensing integrated function. In addition, the present invention realizes the seamless connection between the micro LED display technique and LCD display technique in both horizontal and vertical spaces and thus solves the issue where a conventional LCD panel cannot spatially overlap the optical sensor and the display in order to further meet the full-screen demand.

BRIEF DESCRIPTION OF THE DRAWINGS

These and other features, aspects and advantages of the present disclosure will become understood with reference to the following description, appended claims and accompanying figures.

DETAILED DESCRIPTION OF PREFERRED EMBODIMENTS

Figure 1:
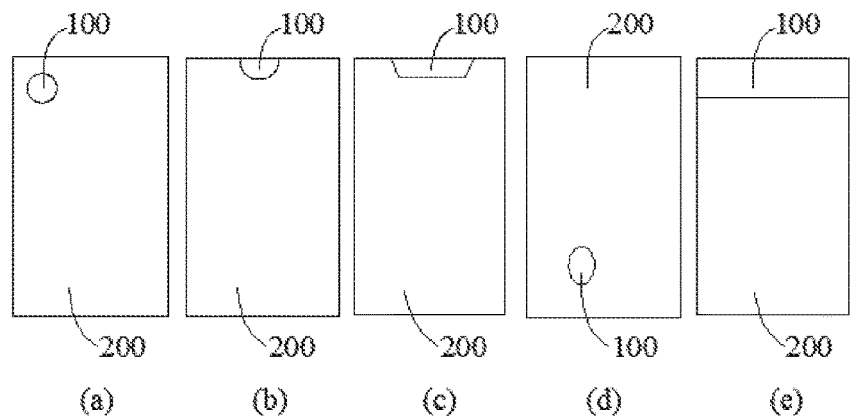
FIG. 1(a)-FIG. 1(e) are top views of different types of display panels according to an embodiment of the present invention.

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present application, and are not to be construed as limiting the scope of the present application.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

Different methods or examples are introduced to elaborate different structures in the embodiments of the present disclosure. To simplify the method, only specific components and devices are elaborated by the present disclosure. These embodiments are truly exemplary instead of limiting the present disclosure. Identical numbers and/or letters for reference are used repeatedly in different examples for simplification and clearance. It does not imply that the relations between the methods and/or arrangement.

Specifically, the terminologies in the embodiments of the present invention are merely for describing the purpose of the certain embodiment, but not to limit the invention. Examples and the appended claims be implemented in the present invention requires the use of the singular form of the book "an", "the" and "the" are intended to include most forms unless the context clearly dictates otherwise. It should also be understood that the terminology used herein that "and/or" means and includes any or all possible combinations of one or more of the associated listed items.

In a medium/small-size display device, the full-screen panel becomes the current development key point. Currently, the display panel could be implemented with an LCD (liquid crystal display) panel and an OLED (organic light-emitting diode) panel. The LCD panel is a passive lighting device illuminated by the backlight module. The LCD panel uses the backlight module to illuminate the liquid crystal layer to control the brightness. In contrast, the OLED panel is an active lighting device illuminated by each OLED pixel. The OLED panel has advantages such as high contrast, thin, flexible and bendable. In addition, the OLED panel could be well integrated with the optical fingerprint identification module. Thus, the in-screen integrated optical sensing technique has become a "unique advantage" of the OLED panel. Although the LCD panel has a low-cost advantage, this advantage becomes unimportant because of the increasing demands of the full-screen.

One objective of the present invention is to provide a display panel and a display device to solve the above-mentioned issue where a conventional LCD panel cannot spatially overlap the optical sensor and the display in order to further meet the full-screen demand.

micro LED, compared with OLED, has a similar active lighting characteristic. Furthermore, because the inorganic LED has a better stability and high efficiency, it has advantages such as long life, high luminance, small control chip, long response time. However, in contrast to the conventional panel made by a subtractive manufacturing, the micro LED is mainly made by a mass-transfer adding manufacturing. The manufacturing process for the micro LED is not mature, especially when massive pixels should be transferred. In other words, it still has some issues such as manufacturing yield and cost.

Another objective of the present invention is to provide a display panel and a display device to solve the issue of the low manufacturing yield of the micro LED when the micro LED is used in the display such that the micro LED could be applied in the display technique.

Furthermore, the micro LED has an electrode surface and a substrate surface. The lighting surface could be the electrode surface or the substrate surface. The electrode surface often has electrodes as a transfer link. However, if the electrode surface is used as a light-emitting surface, the electrodes will block a part of light to influence the lighting efficiency. In other words, the micro LED has a lower lighting efficiency when the electrode surface, compared with the substrate surface, is used as the light-emitting surface.

Another objective of the present invention is to provide a display panel and a display device to solve the above-mentioned issue that the micro LED has a lower lighting efficiency when the electrode surface, compared with the substrate surface, is used as the light-emitting surface.

In the following disclosure, the display device and the display panel according to embodiments of the present invention will be illustrated in details.

Please refer to FIG. 1(a)-FIG. 1(e). FIG. 1(a)-FIG. 1(e) are top views of different types of display panels according to an embodiment of the present invention. The display panel comprises a first pixel area 100 and a second pixel area 200 adjacent to the first pixel area 100. Here, the first pixel area 100 is a micro LED display area. The second pixel area 200 is an LCD display area. The first pixel area 100 and the second pixel area 200 have no gap between them and thus are seamlessly connected to each other. Therefore, there is no display disconnection or discontinuous boundary visually and thus the complete full-screen design could be accomplished. Furthermore, because the micro LED has high luminance and long lifetime, a part of micro LED lighting units in the first pixel area 100 could be used as a fill light or an indication light.

Please refer to FIG. 1(a)-FIG. 1(e) and FIG. 2. The display panel comprises: comprises an array substrate 3, a color film substrate 5 arranged oppositely to the array substrate, a liquid crystal layer 4 between the array substrate 3 and the color film substrate 5, and a backlight module 1 positioned at a side of the color film substrate 3, which is back on to the array substrate 4. In this embodiment, the display panel comprises a plurality of micro LED lighting units 303 in the first pixel area 100. A transparent area is placed among the micro LED lighting units 303. The color film substrate 1 comprises a color filter 305 in the second pixel area 200.

The color film substrate could combine the micro LED display technique with the LCD display technique to accomplish the LCD full-screen design. Furthermore, there is a transparent area between two adjacent micro LED lighting units, and the transparent area could allow the light to pass through. Therefore, the in-screen sensing integration could be accomplished within the first pixel area 100. In addition, for the micro LED lighting unit using its electrode surface as the light-emitting surface, the present invention puts the color film substrate and the array substrate reversely when the LCD cell is formed. This makes the micro LED lighting unit, which originally uses its electrode surface as the light-emitting surface, change to use its substrate surface as the light-emitting surface. This could increase the lighting efficiency and solve the above-mentioned issue of low lighting efficiency caused by using the electrode surface of the micro LED light unit as the light-emitting surface.

Embodiment 1

Figure 2:
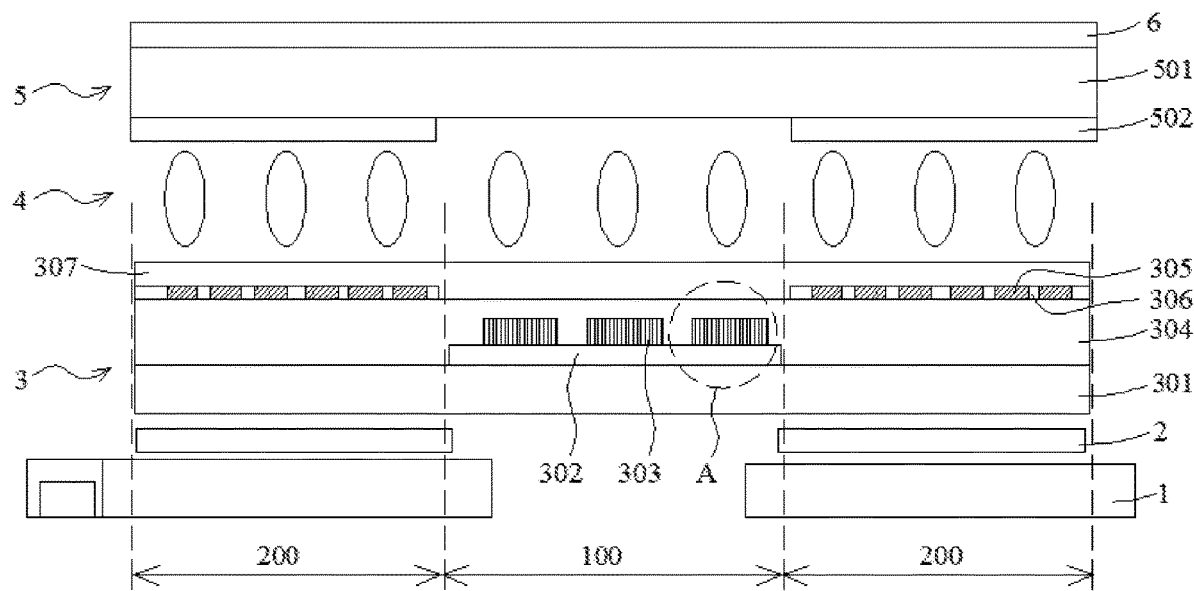
FIG. 2 is a diagram of a cross section of a display panel according to a first embodiment of the present invention.

Please refer to FIG. 2. A display panel of an embodiment will be illustrated in details. The display panel, from the bottom to the top, comprises a back light module 1, a lower polarizer 2, a color film substrate 3, a LC layer 4, an array substrate 5, and an upper polarizer 6.

The color film substrate 3 comprises: a first substrate 301, a first driving circuit 302, a plurality of micro LED lighting units 303, a planarized layer 304, a color filter 305, a black matrix 306, and an over-coating (OC) glue layer 307. In this embodiment, the first substrate could be a glass substrate or a flexible substrate having a higher transparency. The first driving circuit 302 is placed on a surface of the first substrate 301, which is close to the LC layer 4 and the position of the first driving circuit 302 corresponds to the first pixel area 100. The first driving circuit 302 is used to provide a driving signal to the micro LED lighting units 303 such that the micro LED lighting unit 303 could generate light. The micro LED lighting units 303 are placed on a surface of the first substrate 301, which is close to the LC layer 4 and the micro LED lighting units 303 are electrically connected to the first driving circuit 302. The planarized layer 304 is placed on the micro LED lighting units 303 and the first substrate. The planarized layer 304 is used to planarize the surface of the substrate, which is used to form the micro LED lighting units 303. The color filter 305 is placed on the planarized layer 304 and its position is corresponding to the second pixel area 200. Furthermore, the black matrix 306 is placed between two adjacent color filters 305. Here, the positions of the color filter 305 and the black matrix 306 avoids the first pixel area 100. The OC glue layer 307 is placed on the color filter 305 and the black matrix 306. The OC glue layer 307 could planarize the surface of the color film substrate 3.

The first driving circuit 302 comprises scan lines (not shown) and data lines (not shown), where the scan lines extend horizontally and the data lines extend vertically. Two adjacent scan lines and two adjacent data lines define a sub-pixel area. The scan lines and the data lines could also extend to the second pixel area 200. It could be understood that the data lines and the scan lines in the second pixel area 200 may avoid the location of the color filter 305 but could correspond to the location of the black matrix 306 such that the display effect of the second pixel area 200 will not be affected.

The first driving circuit 302 could adopt the active matrix (AM) driving technique. That is, the first driving circuit 302 further comprises TFTs (not shown). Each of the micro LED lighting units 303 is electrically connected to a corresponding scan line and a corresponding to a data line through a corresponding TFT.

In order to first guarantee the aperture rate of the first pixel area 100, the first driving circuit 302 adopts the passive matrix (PM) driving technique. That is, the first driving circuit 302 does not have any TFT.

The micro LED lighting units 303 supports three-color display. That is, the micro LED lighting units 303 comprises red lighting units, green lighting units and blue lighting units. The size of the micro LED lighting unit 303 is 1 μm-100 μm and the height of the micro LED lighting unit 303 is 1 μm-20 μm. Here, the micro LED lighting unit 303 could use its substrate surface or its electrode surface as the light-emitting surface and these changes both falls within the scope of this present invention.

In another embodiment, the micro LED lighting unit 303 adopts the blue display with color conversion scheme. That is, the red lighting unit comprises a blue lighting unit and a color converting layer, which could convert the blue light from the blue lighting unit into the red light. The green lighting unit comprises a blue lighting unit and a color converting layer, which could convert the blue light from the blue lighting unit into the green light. Here, the color converting layer could be a quantum dots film or phosphor and these changes both falls within the scope of this present invention.

Figure 3:
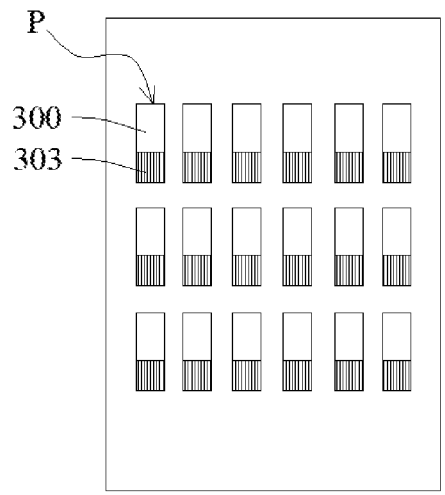
FIG. 3 is a diagram of a display panel having micro LED lighting unit according to an embodiment of the present invention.

Please refer to FIG. 3. FIG. 3 is a diagram of a display panel having micro LED lighting unit according to an embodiment of the present invention. Because the micro LED lighting unit 303 has an advantage of a small size, the orthogonal projection of the micro LED lighting unit 303 on the substrate is smaller than the area of the sub-pixel area P. This makes the transparent areas 300 exist among the micro LED lighting units.

The orthogonal projection of the micro LED lighting unit 303 on the substrate occupies 10%-50% area of the sub-pixel area to make sure that the transparent area 300 is large enough to pass light.

Under the condition that the first pixel area 100 could normally display an image and the covering area of each of the micro LED lighting units 303 is smaller than each of the sub-pixel area P, the light could pass through those areas not covered by the micro LED lighting units 303 in the sub-pixel area P. Therefore, if the micro LED lighting units are controlled to be turned off, the first pixel area 100 could obtain the sensed image from the under-screen sensor. In this way, the under-screen fingerprint identification, under-screen camera, under-screen face identification, under-screen distance sensing, or other under-screen sensing techniques could be accomplished.

Figure 4:
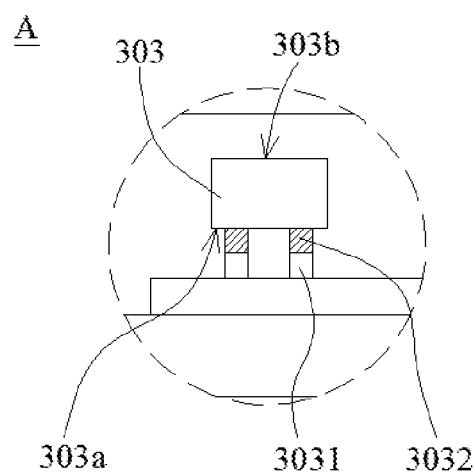
FIG. 4 is a diagram showing a part of the area A shown in FIG. 2.

Please refer to FIG. 4. FIG. 4 is a diagram showing a part of the area A shown in FIG. 2. The micro LED lighting unit 303 comprises the electrode surface 303a and the substrate surface 303b opposite to the electrode surface 303a. The first electrode 3031 is placed on the electrode surface 303a. In this embodiment, the electrode surface 303a of the micro LED lighting unit 303 is facing a side of the backlight module 1. The lighting direction of the micro LED lighting unit 303 is from the electrode 303a to the substrate surface 303b.

The second electrode 3032, corresponding to the first electrode 3031, is placed in the first pixel area 100 of the first substrate 301. The second electrode 3032 lies in the sub-pixel area.

The micro LED lighting unit 303 and the color filter 305 are at the side of the first substrate 301, which is back on to the backlight module 1. The first electrode 3031 of the micro LED lighting unit 303 is electrically connected to the corresponding second electrode 3032 to accomplish the electrical connection between the micro LED lighting unit 303 and the first driving circuit 302.

The first electrode 3031 comprises an N electrode and a P electrode oppositely arranged to the N electrode. The second electrode 3032 comprises an N electrode and a P electrode oppositely arranged to the N electrode. In the transfer printing process of the micro LED lighting unit 303, the N electrode of the micro LED lighting unit 303 is electrically connected to the N electrode of the first substrate 303 and the P electrode of the micro LED lighting unit 303 is electrically connected to the P electrode of the first substrate 303.

Please refer to FIG. 2 and FIG. 4. In this embodiment, the color film substrate 3 and the array substrate 5 are reversely placed. In this way, the micro LED lighting unit 303 on the color film substrate 3 changes to use its substrate surface as the light-emitting surface instead of its electrode surface. Therefore, it could effectively prevent the electrode from blocking a part of light and raise the lighting efficiency. This solves the issue of low lighting efficiency when the electrode surface of the micro LED is used as the light-emitting surface.

Please refer to FIG. 2, the planarized layer 304 is placed in the first pixel area 100 and the second pixel area 200. The material of the planarized layer 304 comprises, but not limited to, an organic resin, OC glue, silica gel, and etc. The material of the planarized layer 304 has a good hightemperature tolerance, a good adhesion, and a good transparency. The thickness of the planarized layer 304 is 3 µm-200 µm. The planarized layer 304 could be used to planarize the step difference on the substrate, which is for the transfer link of the micro LED lighting unit 303.

The height of the micro LED lighting unit 303 is usually 1 µm-20 µm. In order to ensure that the color film substrate is thin and is planarized, the thickness of the planarized layer could be 3 µm-100 µm. In order not to influence the transparency of the first pixel area 100, the transparency of the planarized layer 304 is greater than or equal to 70%.

The array substrate 5 comprises, but not limited to, a second substrate 501 and a second driving circuit 502 placed on one side of the second substrate 501, which is facing the LC layer 4. The second driving circuit 502 is placed in the second display area 200. Because the second driving circuit 502 is not placed in the first pixel area 100 of the display panel, it does not affect the transparency of the first pixel area 100.

The backlight module 1 and the lower polarizer 2 have a hole corresponding to the first pixel area 100. That is, the location of the backlight module 1 and the lower polarizer 2 avoid the location of the first pixel area. In this embodiment, the backlight module 1 is a direct-lit backlight module or an edge-lit backlight module and these changes fall within the scope of the present invention.

In addition, the micro LED lighting units 303 are placed only in the first pixel area 100 of the color film substrate and the first pixel area 100 is comparatively small. Therefore, in contrast to a large area mass transfer, the small area of micro LED lighting unit needs lower cost for mass transfer and recovery. In this way, it could accomplish the micro LED display technique application in the display panel/display device and could solve the issue of low yield and high cost when the mass transfer is performed.

Embodiment 2

Figure 5:
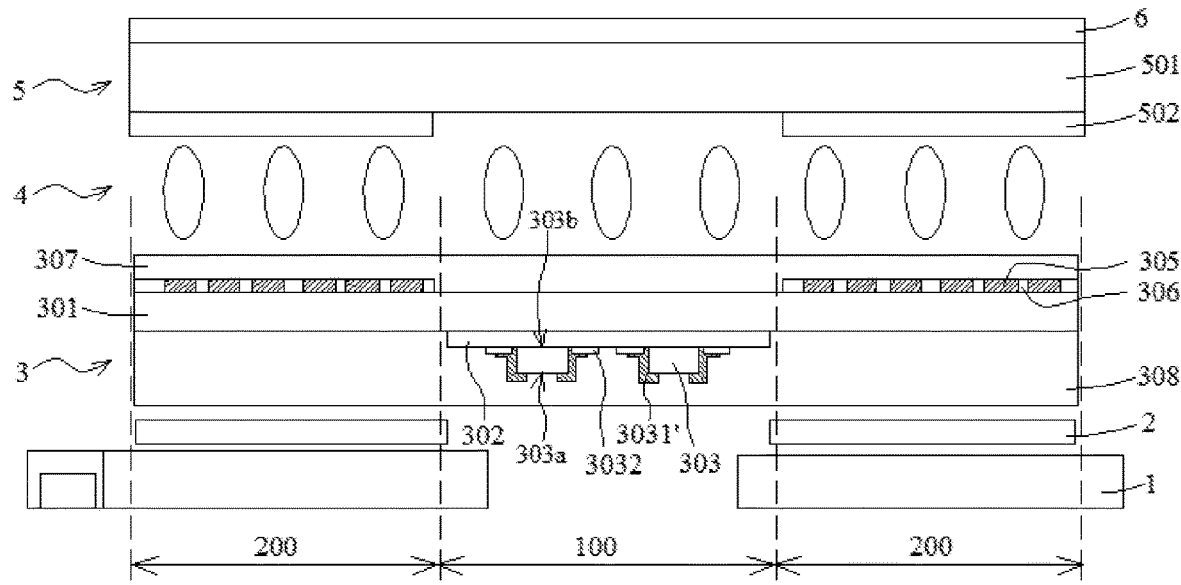
FIG. 5 is a diagram of a display panel according to a second embodiment of the present invention.

Please refer to FIG. 5. FIG. 5 is a diagram of a display panel according to a second embodiment of the present invention. The display panel of this embodiment is similar to the display panel of the first embodiment. The difference between them is:

The micro LED lighting units 303 in the first pixel area are placed in one side of the first substrate 301, which is close to the backlight module 1. The color filter 305 in the second pixel area 200 is placed on the side of the first substrate 301, which is back on to the backlight module 1. The first driving circuit 302 and the second electrode 3032 correspond to the first pixel area 100 and are placed at one side of the first substrate 301, which is close to the backlight module 1. The micro LED lighting units 303 are electrically connected to the second electrode 3032 through the first electrode 3031'. Here, the first electrode 3031' extends from the electrode surface 303a of the micro LED lighting unit 303 to the position of the first substrate 3031 corresponding to the second electrode 3032 along the side surface of the micro LED lighting unit 303.

Furthermore, the surface of the micro LED lighting unit 303 is covered by the packaging layer 308. The packaging layer 308 is used to planarize the micro LED lighting unit 303 and protect the micro LED lighting unit 303 from being damaged.

In this embodiment, the color film substrate 3 and the array substrate 5 are reversely placed. In this way, the micro LED lighting unit 303 on the color film substrate 3 changes to use its substrate surface as the light-emitting surface instead of its electrode surface. Therefore, it could effectively prevent the electrode from blocking a part of light and raise the lighting efficiency. This solves the issue of low lighting efficiency when the electrode surface of the micro LED is used as the light-emitting surface.

Embodiment 3

Figure 6:
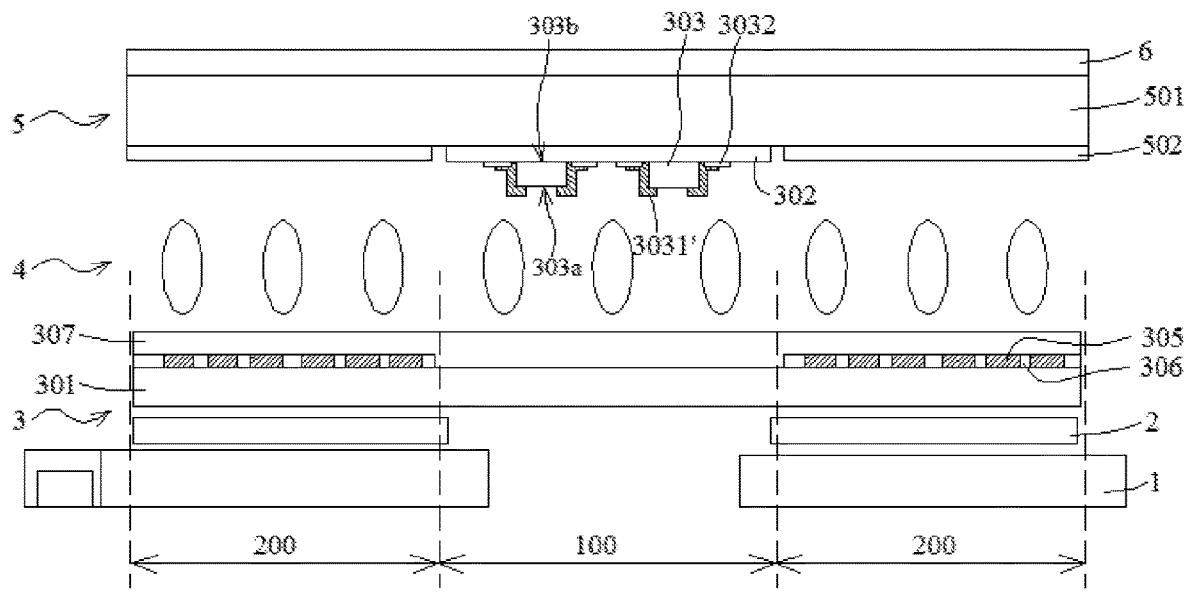
FIG. 6 is a diagram of a display panel according to a third embodiment of the present invention.

Please refer to FIG. 6. FIG. 6 is a diagram of a display panel according to a third embodiment of the present invention. The difference between the display panel of this embodiment and the display panel of the third embodiment is: The micro LED lighting unit 303 is placed on a position of the array substrate 5, which is corresponding to the first pixel area 100. The color film substrate 3 does not have the micro LED lighting unit 303 on a position corresponding to the first pixel area 100. Furthermore, the electrode surface 303a of the micro LED lighting unit 303 on the array substrate 5 faces the color film substrate 3 such that the micro LED lighting unit 303 uses its substrate surface 303b as the light-emitting surface.

The array substrate 5 comprises: the second substrate 501. The micro LED lighting unit 303 corresponds to the first pixel area 100 and is placed on the side of the second substrate 501, which is close to the color film substrate 3. The second driving circuit 502 corresponds to the second pixel area 200 and is placed on the side of the second substrate 501, which is close to the color film substrate 3. Here, the second electrode 3032 is placed on the position of the second substrate 501, which is corresponding to the first pixel area. The second electrode 3032 is correspondingly placed in the sub-pixel area of the first pixel area 100. The electrode surface 303a of the micro LED lighting unit 303 is electrically connected to the corresponding second electrode 3032 through the first electrode 3031'.

The first electrode 3031' extends from the electrode surface 303a of the micro LED lighting unit 303 to the position of the second substrate 501, which is corresponding to the second electrode 3032, along the side surface of the micro LED lighting unit 303.

The other structure of the display panel of this embodiment is similar to the display panel of the first embodiment and further illustration is omitted here.

In this embodiment, the color film substrate 3 and the array substrate 5 are reversely placed. In this way, the micro LED lighting unit 303 on the color film substrate 3 changes to use its substrate surface as the light-emitting surface instead of its electrode surface. Therefore, it could effectively prevent the electrode from blocking a part of light and raise the lighting efficiency. This solves the issue of low lighting efficiency when the electrode surface of the micro LED is used as the light-emitting surface.

Figure 7:
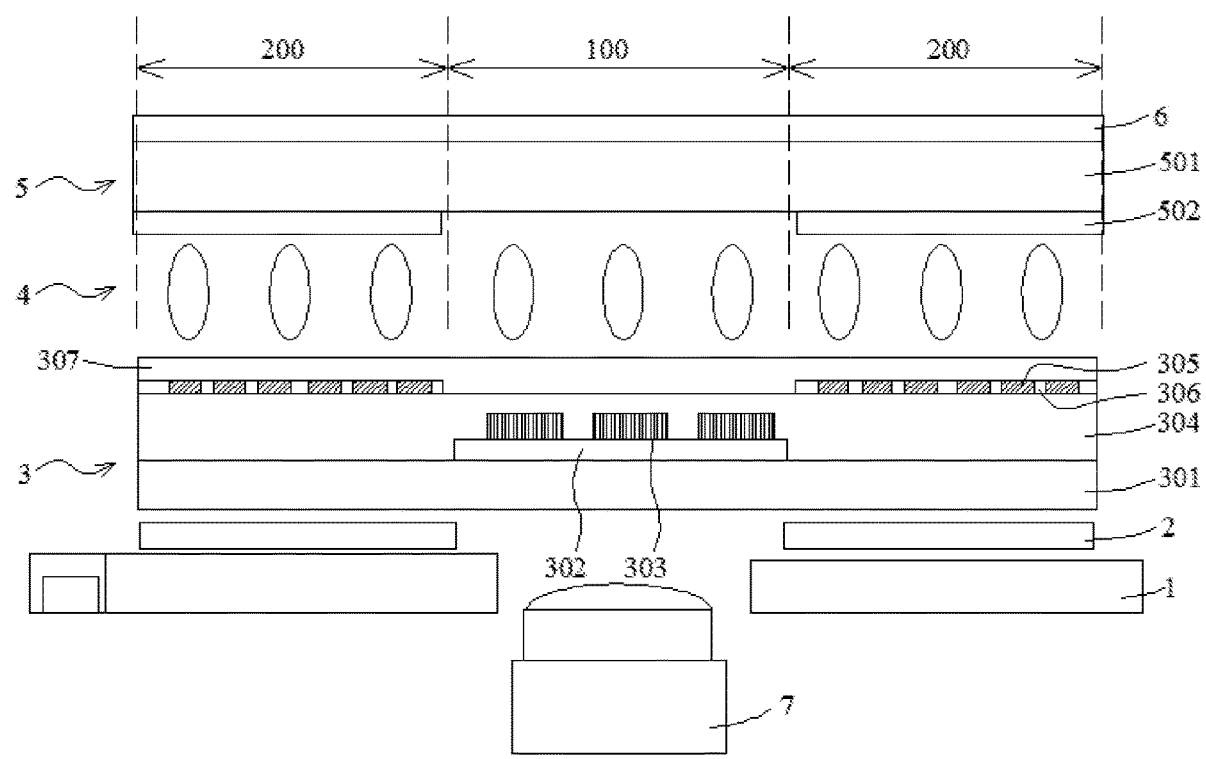
FIG. 7 is a diagram of a display device according to an embodiment of the present invention.

According to an embodiment of the present invention, a display device is provided. Please refer to FIG. 7. FIG. 7 is a diagram of a display device according to an embodiment of the present invention. The display device comprises the above-mentioned display panel and a sensor component 7. The backlight module 1 has a hole, which is at a position corresponding to the first pixel area 100. The sensor component 7 is placed correspondingly to the hole.

The sensor component 7 is an optical sensor, which could be used to accomplish the face identification function, the distance sensing function, or the finger identification function. All these changes fall within the scope of the present invention.

From the above, the display panel and the display device according to an embodiment of the present invention could combine the micro LED display technique with the LCD display technique. In this way, the LCD full-screen panel could be realized. In addition, because the micro LED lighting unit is small, this could raise the aperture rate of the panel and realize the in-screen sensing integrated function. In addition, the present invention realizes the seamless connection between the micro LED display technique and LCD display technique in both horizontal and vertical spaces and thus solves the issue where a conventional LCD panel cannot spatially overlap the optical sensor and the display in order to further meet the full-screen demand. In addition, for the micro LED lighting unit using its electrode surface as the light-emitting surface, the present invention puts the color film substrate and the array substrate reversely when the LCD cell is formed. This makes the micro LED lighting unit, which originally uses its electrode surface as the light-emitting surface, change to use its substrate surface as the light-emitting surface. This could increase the lighting efficiency and solve the above-mentioned issue of low lighting efficiency caused by using the electrode surface of the micro LED light unit as the light-emitting surface.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A display panel, comprising a first pixel area and a second pixel area adjacent to the first pixel area, wherein the display panel comprises an array substrate, a color film substrate arranged oppositely to the array substrate, a liquid crystal layer between the array substrate and the color film substrate, and a backlight module positioned at a side of the color film substrate, wherein the side of the color film is facing away the array substrate;
   wherein, the display panel comprises a plurality of micro light emitting diode (micro LED) lighting units, a transparent area is placed among the micro LED lighting units, and the color film substrate comprises a color filter in the second pixel area;
   wherein the micro LED lighting units are located in the first pixel area and between the array substrate and the backlight module, and the backlight module has a hollow region substantially corresponding to the first pixel area,
   wherein each of the micro LED lighting units comprises an electrode surface facing the hollow region of the backlight module, and the electrode surface has a first electrode,
   wherein each of the micro LED lighting units further comprises a substrate surface opposite to the electrode surface, and a lighting direction of the micro LED lighting unit is from the electrode surface to the substrate surface,
   wherein the array substrate comprises a second substrate;
   the micro LED lighting units are corresponding to the first pixel area and placed on a side of the second substrate, which is close to the color film substrate, and
   wherein a second electrode corresponding to the first electrode is placed on a position of the second substrate, which corresponds to the first pixel area; and the first electrode is electrically connected to the second electrode.

2. The display panel of claim 1, wherein the first electrode extends from the electrode surface of the micro LED lighting unit to the position of the second substrate, which is corresponding to the second electrode, along a side surface of the micro LED lighting unit.

3. The display panel of claim 1, wherein the array substrate further comprises a second driving circuit, corresponding to the second pixel area and placed on the second substrate.

4. A display device comprising:
   a display panel, comprising a first pixel area and a second pixel area adjacent to the first pixel area, wherein the display panel comprises an array substrate, a color film substrate arranged oppositely to the array substrate, a liquid crystal layer between the array substrate and the color film substrate, and a backlight module positioned at a side of the color film substrate, wherein the side of the color film is facing away the array substrate;
   wherein, the display panel comprises a plurality of micro light emitting diode (micro LED) lighting units, a transparent area is placed among the micro LED lighting units, and the color film substrate comprises a color filter in the second pixel area;
   wherein the micro LED lighting units are located in the first pixel area and between the array substrate and the backlight module, and the backlight module has a hollow region substantially corresponding to the first pixel area, and
   wherein each of the micro LED lighting units comprises an electrode surface facing the hollow region of the backlight module, and the electrode surface has a first electrode,
   wherein each of the micro LED lighting units further comprises a substrate surface opposite to the electrode surface, and a lighting direction of the micro LED lighting unit is from the electrode surface to the substrate surface,
   wherein the array substrate comprises a second substrate;
   the micro LED lighting units are corresponding to the first pixel area and placed on a side of the second substrate, which is close to the color film substrate, and
   wherein a second electrode corresponding to the first electrode is placed on a position of the second substrate, which corresponds to the first pixel area; and the first electrode is electrically connected to the second electrode.

5. The display device of claim 4, wherein the first electrode extends from an electrode surface of the micro LED lighting unit to a position of the second substrate, which is corresponding to the second electrode, along a side surface of the micro LED lighting unit.

* * * * *